US012252997B2

(12) United States Patent
Preece

(10) Patent No.: US 12,252,997 B2
(45) Date of Patent: Mar. 18, 2025

(54) SPLINE CLEANING DEVICE

(71) Applicant: ROLLS-ROYCE plc, London (GB)

(72) Inventor: Christopher J. Preece, Derby (GB)

(73) Assignee: Rolls-Royce PLC, London (GB)

(*) Notice: Subject to any disclaimer, the term of this patent is extended or adjusted under 35 U.S.C. 154(b) by 260 days.

(21) Appl. No.: 18/051,100

(22) Filed: Oct. 31, 2022

(65) Prior Publication Data

US 2023/0149979 A1 May 18, 2023

(30) Foreign Application Priority Data

Nov. 17, 2021 (GB) ...................................... 2116563

(51) Int. Cl.
*F01D 25/00* (2006.01)
*B08B 1/16* (2024.01)
*B08B 9/00* (2006.01)

(52) U.S. Cl.
CPC ............ *F01D 25/002* (2013.01); *B08B 1/165* (2024.01); *B08B 9/00* (2013.01); *F05D 2220/32* (2013.01)

(58) Field of Classification Search
CPC .......... F01D 25/002; B08B 1/165; B08B 1/16
See application file for complete search history.

(56) References Cited

U.S. PATENT DOCUMENTS

2006/0083612 A1* 4/2006 Roney .................. F01D 25/002 416/61
2013/0185877 A1 7/2013 Clark et al.
2018/0149038 A1* 5/2018 Eriksen ..................... B08B 9/00
2018/0272389 A1* 9/2018 Sheldon ............... A46B 5/0095
2020/0072077 A1* 3/2020 Harner .................. F01D 21/003
2022/0235554 A1* 7/2022 Lindl ...................... A47L 9/327

FOREIGN PATENT DOCUMENTS

DE 102015214999 A1 2/2017
EP 3382162 A2 10/2018

OTHER PUBLICATIONS

Great Britain search report dated Mar. 30, 2022, issued in Great Britain Patent Application No. 2116563.4.
European Search report dated Feb. 14, 2023, issued in EP Patent Application No. 22201784.0.

* cited by examiner

*Primary Examiner* — Katheryn A Malatek

(57) ABSTRACT

A spline cleaning device for cleaning splines formed within a component of a gas turbine engine. The spline cleaning device comprises: a central support; a central support sleeve that surrounds and is movable with respect to the central support; a scraper having protrusions that substantially correspond to the splines, the scraper being attachable to the central support sleeve, and configured to remove surface contaminants from the surface of the splines; and a collector sump that is attachable to the central support and configured to collect the surface contaminants that have been removed from the surface of the splines.

15 Claims, 6 Drawing Sheets

SPLINE CLEANING DEVICE

CROSS-REFERENCE TO RELATED APPLICATIONS

This application is based upon and claims the benefit of priority from United Kingdom patent application number GB 2116563.4 filed on Nov. 17, 2021, the entire contents of which is incorporated herein by reference.

BACKGROUND

Technical Field

The present disclosure relates to spline cleaning devices, more specifically a device for cleaning splines formed in the inner surface of a hollow shaft, e.g. the shaft of a gas turbine engine.

Description of the Related Prior Art

Splines are ridges or grooves that form part of a component. They typically take the form of a series of uniform spaced ridges or grooves that run parallel to the axis of the component. Splines are found in a wide variety of mechanical devices including gas turbine aircraft engines. They may for example be formed within the internal surface of gas turbine engine shafts.

Splines can be male or female i.e. ridges or groves respectively. Female splines are typically formed to match or mate with male splines.

Splines can accrue debris over time. For example splines in a gas turbine engine component are typically covered by swarf or burnt oil which can cause the splines to become worn, potentially affecting performance and requiring cleaning or replacement. Excessive wearing and performance loss may even affect safe operation of the engine.

Cleaning splines can be difficult, firstly in achieving access to the splines, and secondly in cleaning them effectively. It is also difficult to capture debris that is removed from the splines.

SUMMARY

According to a first aspect there is provided a spline cleaning device for cleaning splines formed within a component of a gas turbine engine, the spline cleaning device comprising a central support, a central support sleeve that surrounds and is movable with respect to the central support. A scraper having protrusions, the scraper being attachable to the central support sleeve, and configured to remove surface contaminants from the splines; and a collector sump that is attachable to the central support and configured to collect the surface contaminants that have been removed from the splines.

In some embodiments the central support is tubular with a circular cross-section. The circular cross-section allows for the central support sleeve to be indexed around the splines without having to extract the central support sleeve completely from the central support, reducing the distance that central support sleeve has to move. A circular cross section allows for easier centralization around the support sleeve when the scraper is in contact with the splines.

In some embodiments the central support sleeve surrounds at least a substantial portion of the central support. This ensures that the location of the central support sleeve in relation to the central support is maintained.

In some embodiments the central support sleeve and the central support comprise the same material. This will reduce any preferential wear due to the reciprocating manner of the central support sleeve with the central support to be minimised.

In some embodiments the scraper has a central hub and a central hole, the central hub has an internal surface that is threaded for attaching the scraper to a corresponding threaded portion on the central support sleeve. This allows for disassembly that can support storage. It also can allow for different scrapers to be attachable to the central support sleeve, allowing for different spline configurations.

In some embodiments the central hub has viewing apertures. This enables the operator to view through the central hub to see the splines and ensure that the protrusions of the scraper are correctly engaged with the splines. It also allows for the splines to be seen to determine if further cleaning is required during operation of the device.

In some embodiments the scraper has arm portions each arm portion having an external circumferential surface upon which the protrusions are formed. Arm portions reduce the overall friction that may be experienced when using the device due to the interaction between the splines and the protrusions.

In some embodiments the arm portions are equally spaced with respect to the central hub. Equally spaced arm portions ensure that the forces are equally distributed around the central hub, this aids the centralization of the scraper with the central support.

In some embodiments the scraper has lubrication ports and lubricant passageways, the lubrication ports being configured to receive a mobilising fluid from a source of mobilising fluid, and the lubricant passageways being configured to transport the mobilising fluid from the lubrication ports to the external circumferential surface of the scraper. The mobilising fluid may react with the debris to reduce the adherence of the debris to the spline. The fluid may partially dissolve the debris. The fluid provides a means for transporting the debris from the splines to the sump. The mobilising fluid may also reduce wear on the splines as it will act as a lubricant between the scraper and the splines.

In some embodiments the material hardness of the protrusions is less than the material harness of the splines. This may prevent wear on the splines when the two surfaces are in contact.

In some embodiments the collector sump has a threaded portion that corresponds to a threaded portion of the central support.

In some embodiments the collector sump is shaped to collect debris from the splines that has been removed by the scraper. The collector sump may be shaped to enable the position of the engine to be in either the vertical or horizontal position. This does not restrict how the engine must be positioned.

In some embodiments the collector sump has a sealing lip that seals against the component of the gas turbine engine at a position adjacent the splines. The lip ensures all debris is collected in the sump and prevents loosened debris from ingress into the engine. This may prevent an additional engine clean operation.

In some embodiments the collector sump comprises a material that has a Shore hardness of about 70 A. This allows for the sump to be introduced into the engine past the splines and to provide an effective seal when in its final position.

In a second aspect there is provided a method for cleaning splines formed within a shaft of a gas turbine engine, the method comprising the steps of: providing the spline cleaning device of the first aspect; attaching the central support and the collector sump; and inserting the attached central support and the collector sump along the central axis of the engine beyond the female splines of the IPC coupling so that it covers the oil circulation holes; and attaching the scraper to the central support sleeve; and applying the central support sleeve over the central support and moving the central support sleeve in an axial direction so that the scraper engages with the female spline; and cleaning the female splines by moving the central support sleeve in an axial direction and rotating until all female splines have been cleaned.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

The term "spline" as used herein means a series of uniform spaced ridges or grooves on a component that run parallel to the axis of the component.

Throughout this specification and in the claims that follow, unless the context requires otherwise, the word "comprise" or variations such as "comprises" and "comprising", will be understood to imply the inclusion of a stated integer or group of integers but not the exclusion of any other stated integer or group of integers.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

Figure 1:
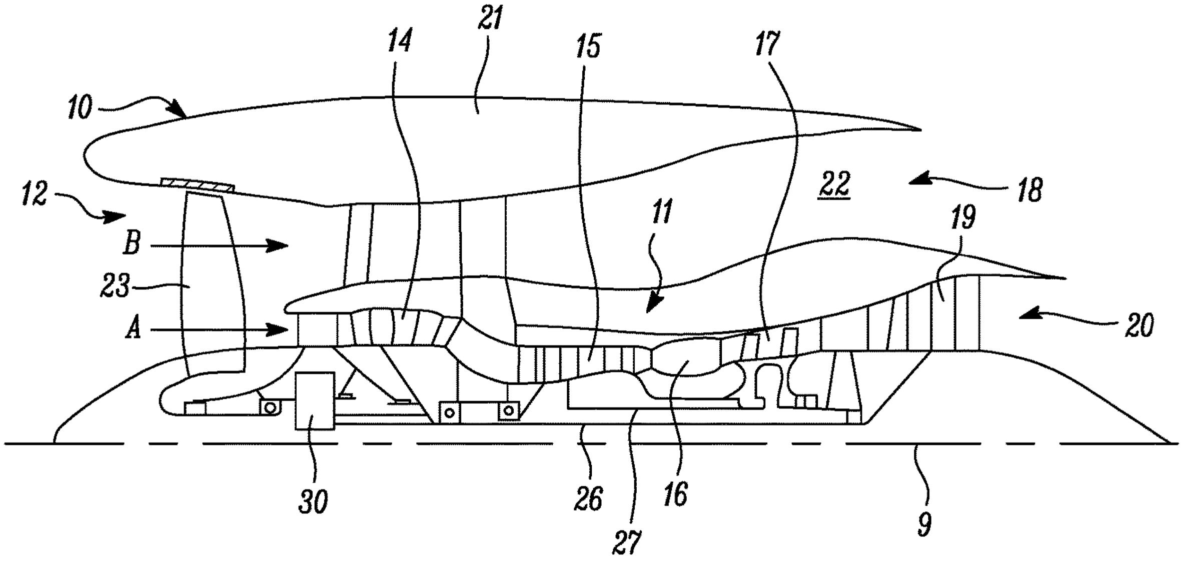
FIG. 1 is a sectional side view of a gas turbine engine, more particularly a geared turbofan aircraft engine.

The following table lists the reference numerals used in the drawings with the features to which they refer:

| Ref no. | Feature | FIG. |
|---|---|---|
| A | Core airflow | 1 |
| B | Bypass airflow | 1 |
| 9 | Principal and rotational axis (of engine) | 1, 2 |
| 10 | Gas turbine engine | 1 |
| 11 | Engine core | 1 |
| 12 | Air intake | 1 |

-continued

| Ref no. | Feature | FIG. |
|---|---|---|
| 14 | Low pressure compressor | 1 |
| 15 | High pressure compressor | 1 |
| 16 | Combustion equipment | 1 |
| 17 | High pressure turbine | 1 |
| 18 | Bypass exhaust nozzle | 1 |
| 19 | Low pressure turbine | 1 |
| 20 | Core exhaust nozzle | 1 |
| 21 | Fan nacelle | 1 |
| 22 | Bypass duct | 1 |
| 23 | Fan | 1, 2 |
| 24 | Stationary supporting structure | 2 |
| 26 | Shaft | 1, 2 |
| 27 | Shaft | 1 |
| 28 | Sun gear | 2 |
| 30 | Epicyclic gearbox | 1, 2 |
| 32 | Planet gear | 2 |
| 34 | Planet carrier | 2 |
| 36 | Linkage | 2 |
| 38 | Ring gear | 2 |
| 40 | Linkage | 2 |
| 50 | Auxiliary gearbox | 4 |
| 55 | Auxiliary gearbox drive shaft | 4 |
| 60 | Intermediate pressure compressor (IPC) coupling | 4, 5 |
| 65 | Female spline | 5 |
| 70 | Engine oil ways of IPC coupling | 5 |
| 100 | Spline cleaning device | 6, 7 |
| 110 | Central support | 6, 7 |
| 112 | First end (of central support) | 6, 7 |
| 113 | Threaded portion of central support | 6, 7 |
| 114 | Second end (of central support) | 6, 7 |
| 115 | Threaded nut | 6, 7 |
| 120 | Central support sleeve | 6, 7 |
| 122 | First end of central support sleeve | 6, 7 |
| 124 | Second end of central support sleeve | 6, 7 |
| 125 | Threaded portion of central support sleeve | 6, 7 |
| 130 | Scraper | 6, 7 |
| 132 | Central hub of scraper | 6, 7 |
| 133 | Internal surface of central hub | 6, 7 |
| 135 | Central hole of scraper | 6, 7 |
| 137 | Lubrication port of scraper | 6 |
| 140 | Collector sump | 6, 7 |
| 141 | Sealing Lip | 6, 7 |
| 143 | Threaded portion of collector sump | 6, 7 |
| 145 | Central hole | 6, 7 |
| 147 | Internal thread of central hole | 6, 7 |
| 150 | Lubricant passageway | 6 |
| 160 | Viewing aperture | 6 |
| 180 | Arm portion of scraper | 6, 7 |
| 190 | External circumferential surface | 6, 7 |
| 192 | Protrusions | 6 |

DETAILED DESCRIPTION

Aspects and embodiments of the present disclosure will now be discussed with reference to the accompanying figures. Further aspects and embodiments will be apparent to those skilled in the art.

Figure 2:
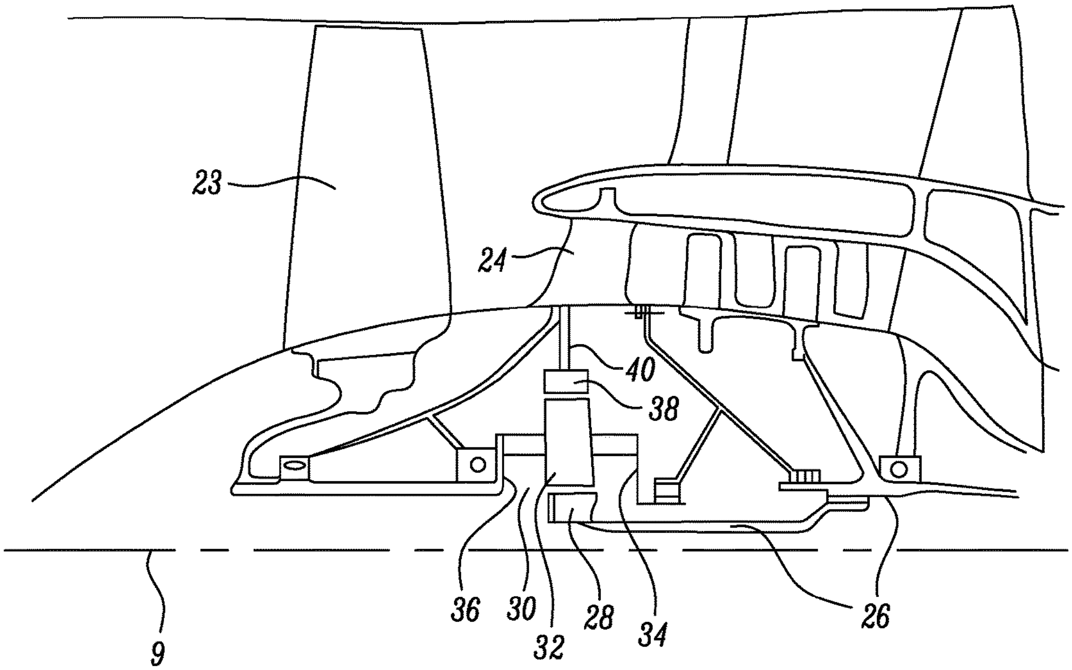
FIG. 2 is a close-up sectional side view of an upstream portion of the gas turbine engine shown in FIG. 1.
Figure 3:
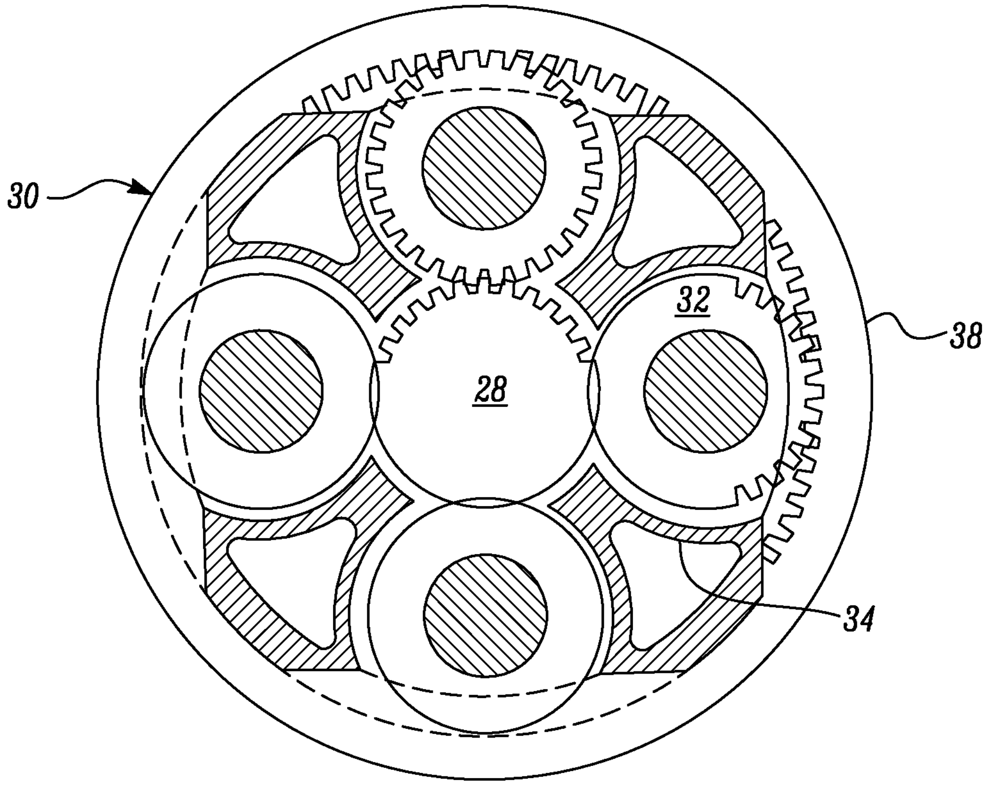
FIG. 3 is a partially cut-away view of a gearbox for the gas turbine engine show in FIGS. 1 and 2.

The present disclosure provides a spline cleaning device, for example, for cleaning splines formed within a shaft of a gas turbine engine. FIGS. 1, 2 and 3 describe a gas turbine engine for which the spline cleaning device of the present disclosure is suitable for use, although the person skilled in the art would appreciate the spline cleaning device could be used to clean splines formed within a shaft of any gas turbine engine or indeed within a shaft of any machine or apparatus.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

The present disclosure concerns a spline cleaning device that is useful, for example, for cleaning splines formed in the inner surface of a gas turbine engine.

Figure 4:
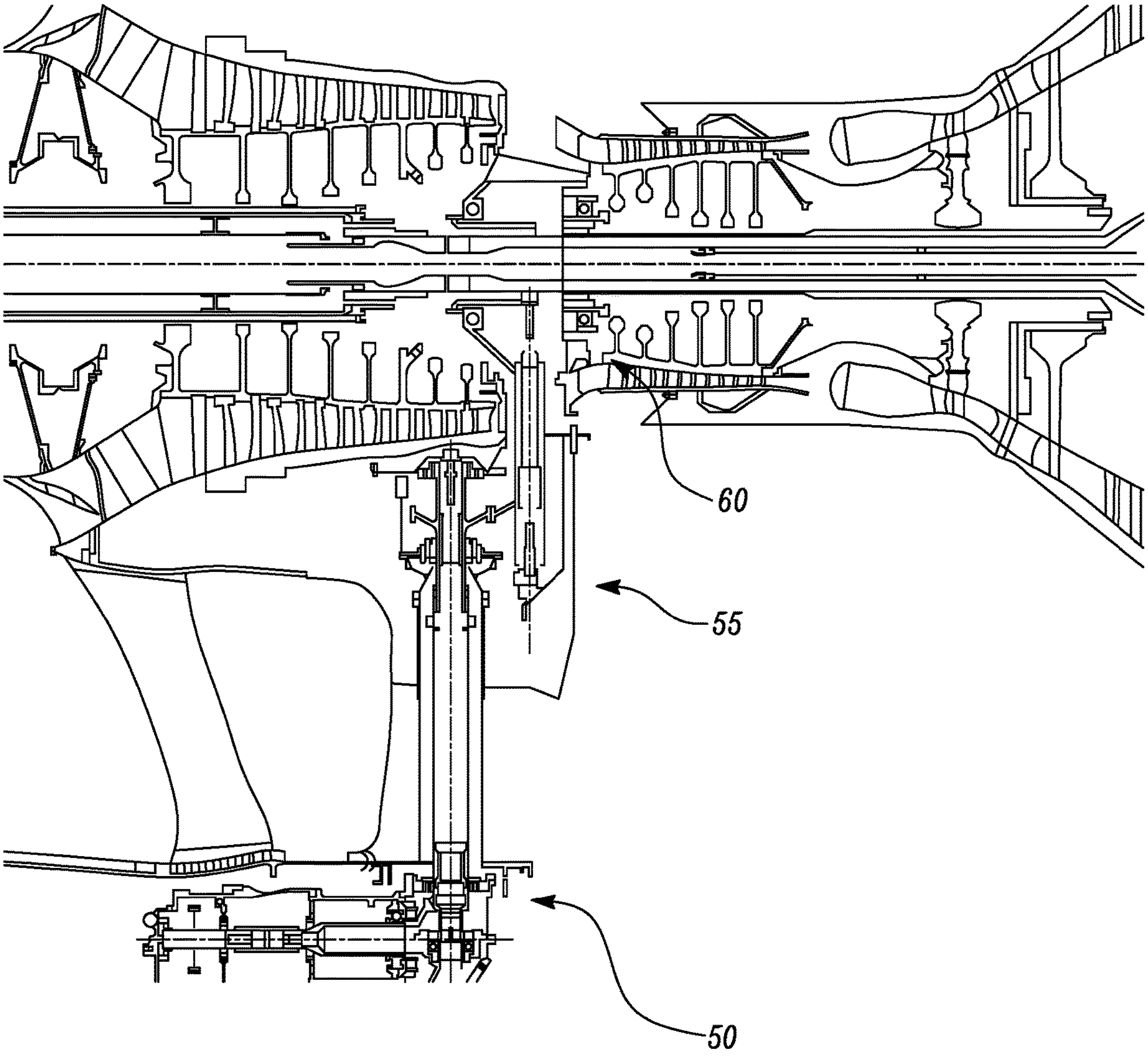
FIG. 4 is a sectional view of gas turbine engine showing the auxiliary gearbox power offtake from the intermediate pressure compressor (IPC) coupling.

FIG. 4 is a cutaway view of the part of the gas turbine engine shown in FIGS. 1, 2 and 3 that identifies the location of a component that has splines that can be cleaned by using the spline cleaning device of the present disclosure. That component is an IPC coupling 60.

Figure 5:
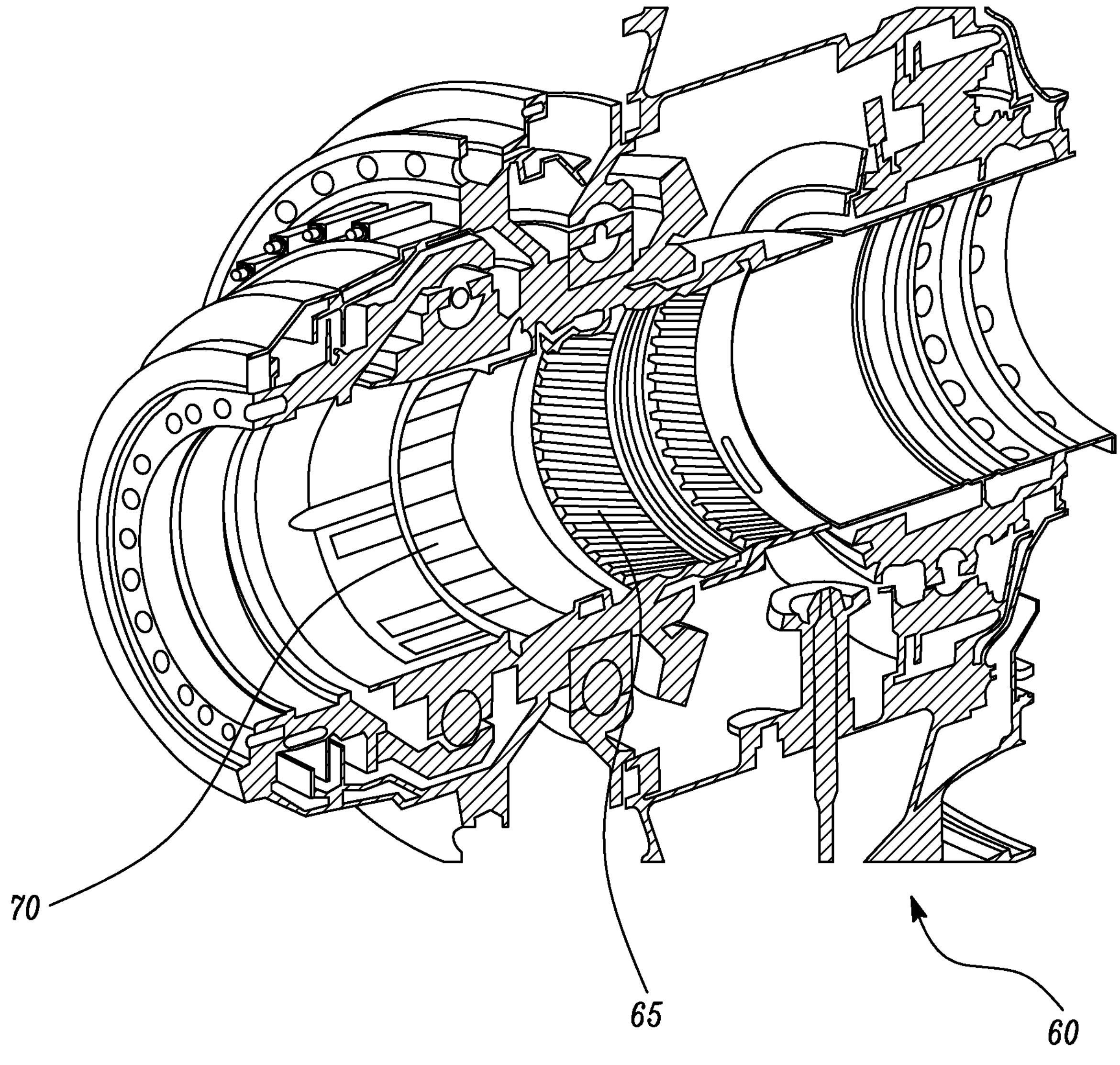
FIG. 5 is a close-up sectional view of the IPC coupling shown in FIG. 4 showing the internal splines.

FIG. 5 is a close-up perspective view of the IPC coupling 60 shown in FIG. 4. It has splines 65 that can be cleaned by using the spline cleaning device of the present disclosure.

In operation the gas turbine engine 10 is required to provide mechanical drive to additional auxiliary components, for example fuel pump, hydraulic pumps, oil pumps. The gas turbine engine shown in FIGS. 1 to 3 has an auxiliary gearbox 50 that provides mechanical drive to various units in the engine. The auxiliary gearbox is driven from an auxiliary gearbox drive shaft 55 that interfaces with the shaft 27 via the intermediate pressure compressor (IPC) coupling 60. The IPC coupling 60 has female splines 65 that mate with male splines (not shown) on the shaft 27. The IPC coupling 60 rotates with the shaft 27 and provides a mechanical drive to the auxiliary gearbox drive shaft 55 (through gears). Conversely, at engine start up the IPC coupling 60 is able to rotate the shaft 27 by driving the auxiliary gearbox through a variable frequency starter generator (VFSG). The IPC coupling 60 has oil ways 70 that allow oil to flow from the shaft to the engine.

During operation the female spline 65 of the IPC coupling 60 accrue debris such as swarf or burnt oil, this can result in excessive wear of the female splines 65 and the male splines as the debris acts as a grinding paste. Excessive wear may lead to the replacement of both the IPC coupling 60 and the shaft 27.

In order to reduce wear of the IPC coupling 60 a method and device for cleaning debris from the female splines 65 is required that will enable the female splines to be cleaned without requiring the engine to be fully stripped.

Figure 6:
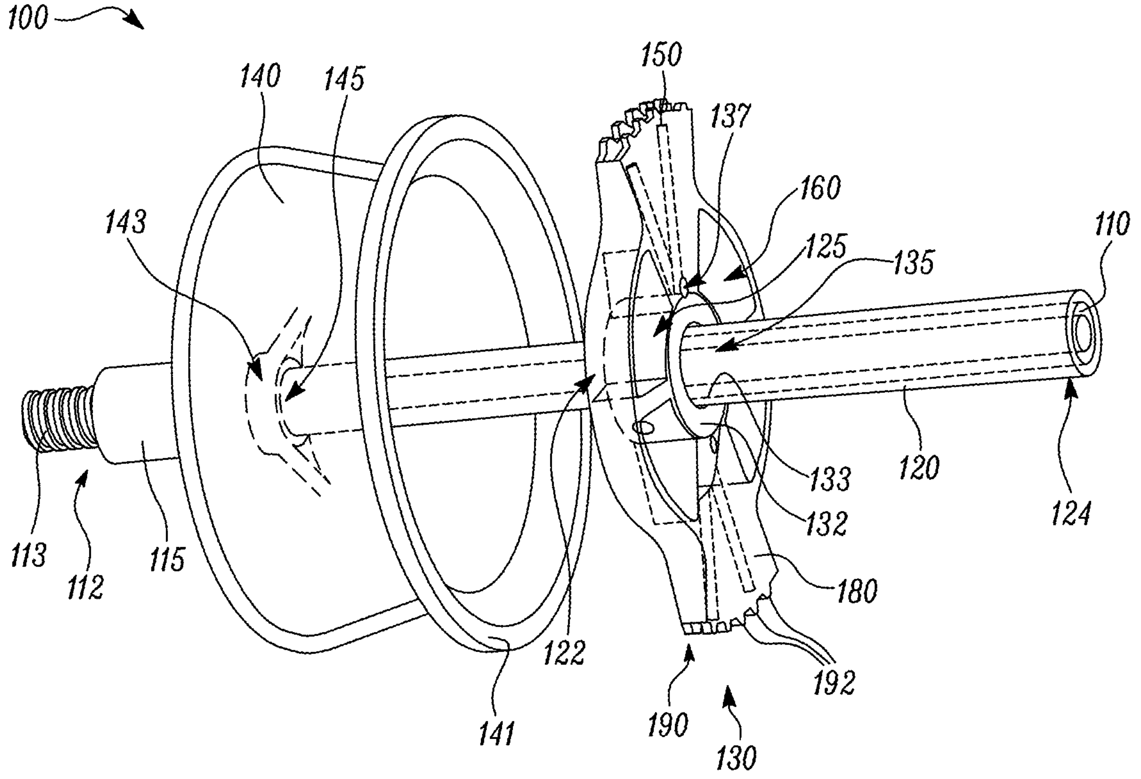
FIG. 6 is a view of the spline cleaning device of the present disclosure.
Figure 7:
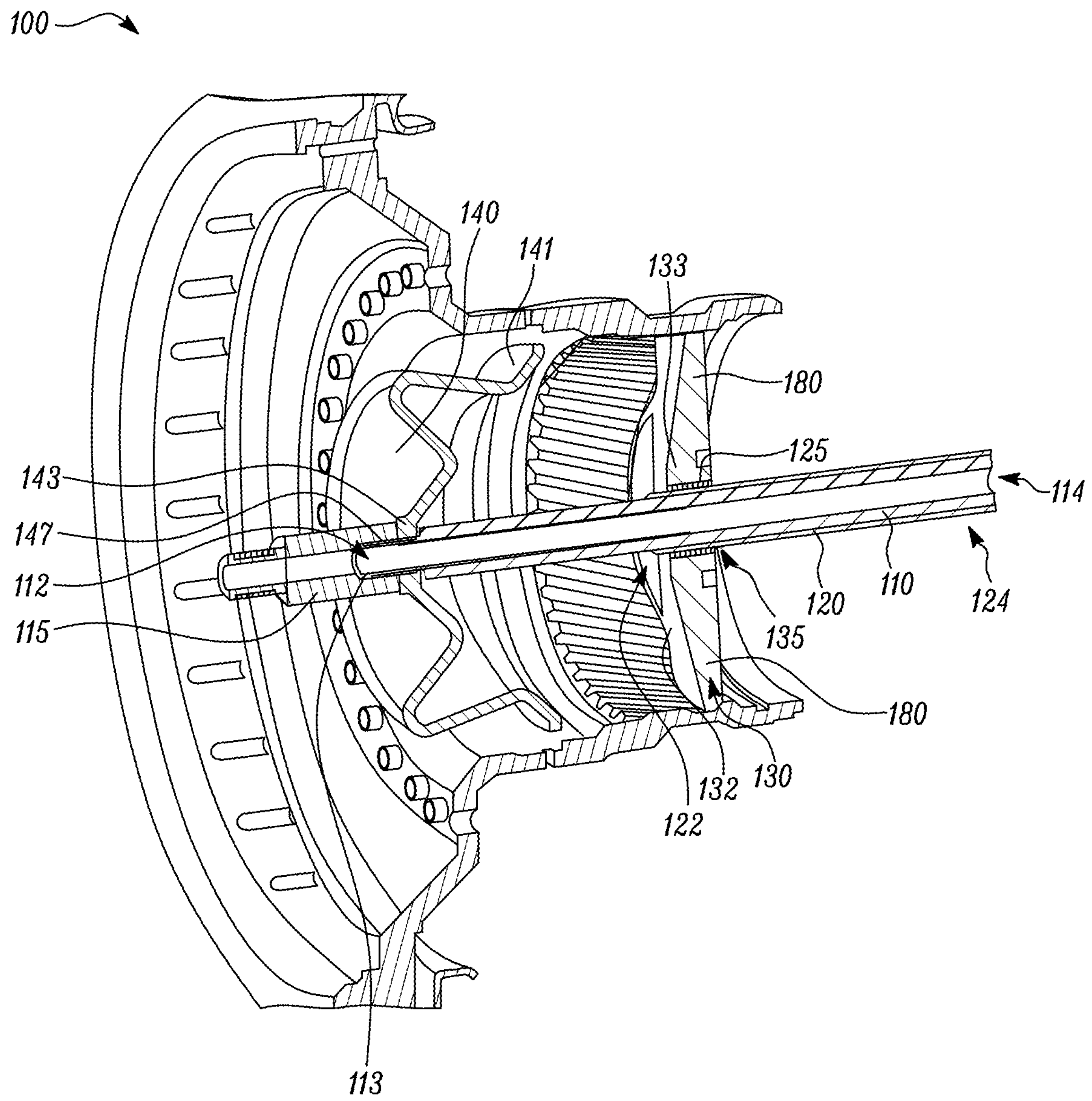
FIG. 7 is a sectional view of the spline cleaning device in situ with the internal splines of the IPC coupling.

FIG. 6 is a perspective view of a spline cleaning device of the present disclosure and FIG. 7 is a sectional view of the spline cleaning device in situ within the IPC coupling 60 of the gas turbine engine 10.

The spline cleaning device 100 has a central support 110, a central support sleeve 120, a scraper 130 and a collector sump 140.

The central support 110 is elongate with a first end 112 and a second end 114. In the embodiment shown, the central support 110 has a circular cross section and is hollow. The first end 112 of the central support has a threaded portion 113 to enable the collector sump 140 to be removably attached to the central support 110.

The collector sump 140 prevents or at least minimises the ingress of debris into the engine oil ways 70 of the IPC coupling 60. The collector sump is flexible to enable it to be introduced passed the splines into the component and to be expandable to create a seal between the collector sump and the IPC coupling. In the embodiment shown, the collector sump 140 is an 'W' section. This 'W' section allows for the use of the device to be in either of the horizontal or vertical planes. The collector sump has a central hole 145, the central hole has an internal thread 147 by which the collector sump is attachable to the threaded portion of the first end of the shaft 112. The collector sump can be made from any suitable material. In the embodiment shown the collector sump is produced from polyethylene. In the embodiment shown the collector sump has a Shore hardness rating of about 70 A, (the Shore A hardness scale measures the harness of flexible mold rubbers that range in hardness from very soft and flexible to hard with no flexibility. Shore hardness is measured with a Shore Durometer which is commercially available standard testing equipment). The collector sump can be made by any suitable method, for example it may be moulded.

The collector sump 140 is configured to be attachable to the first end 112 of the central support 110. The collector sump 140 can be attached to the first end of the central support 110 in any suitable manner. The collector sump 140 may be permanently attached or removable attached to the central support 110 as desired.

In the embodiment shown, the first end 112 of the central support 110 has a threaded portion and the collector sump 140 has a corresponding threaded portion 143 and the collector sump is removably attachable to the central support 110. This in part enables the spline cleaning device to be assembled when needed and dissembled and stored when not needed.

In other embodiments, a threaded nut 115 may be used to attach the collector sump 140 to the central support 110.

The central support sleeve 120 has a first end 122 and a second end 124. The central support sleeve 120 is a hollow section. In the embodiment shown, the first end 122 has a threaded portion to enable the scraper 130 to be attached to the central support sleeve 120. The cross section of the central support sleeve 120 is the same as the central support 110. The internal hollow section of the central support sleeve 120 is a clearance fit with the central support 110. The clearance fit allows for the central support sleeve 120 to move relative to the central support 120 in an axial and radial direction. The central support sleeve 120 supports the scraper 130 and ensures that the scraper 130 is axially aligned with the central support 110 and the female splines 65.

The scraper 130 has a central hub 132 and a central hole 135 that allows for the scraper to be positioned over the central support sleeve 120. The scraper 130 is attachable to the first end 122 of the central support sleeve such that the scraper will move with the central support sleeve over the support shaft. The scraper 130 can be attached to the first end of the central support sleeve 120 in any suitable manner, for example the first end 122 of the central support sleeve 110 has a threaded portion (125) and the scraper 130 has a corresponding portion. The scraper 130 or at least the central hub 132 may have a circular cross-section. The scraper 130 has at least one, or ideally a plurality of protrusion 192 that extend form the external circumferential surface 190, these protrusions 192 are configured to substantially correspond to the root and flanks of the female splines 65 of the IPC coupling 60. The external circumferential surface is configured to substantially correspond to the face of the female splines 65. In some embodiments, such as the one shown in FIG. 6, the scraper has arm portions 180 that extend from the central hub 132 and the protrusions 192 that engage the splines to be cleaned are formed at distal ends of those arm portions. The scraper 130 has at least two arm portions 180. In the embodiment shown in FIG. 6 the scraper has two arm portions are equally spaced around the axis of the central hub 132 such that the scrapper 130 is centralised around the axis. The equally spacing of the arm portions 180 allows for the acting forces to be equalised across the scraper helping the scraper to stay in contact with the female splines of the component and ensures that the spline cleaning device stays central to the cleaning axis.

The scraper 130 may have lubricant passageways 150 that extend from the central hub to the external circumferential surface 190. The scraper 130 has lubrication ports 137 that extend into the lubricant passageways 150. The lubricant passageways 150 are formed to receive fluid, such as a mobilising fluid e.g. acetone, and to transport the fluid to the circumferential surface. This mobilising fluid is used to aid the release of debris from the surface of the female spline 65 by partially dissolving the debris.

The scraper 130 may include viewing apertures 160, these viewing apertures enable the female splines 65 to be seen when the scraper is in operation. In the embodiment shown the viewing apertures are formed in the central hub 132 of the scraper.

The proposed use of the spline cleaning device of the present disclosure and a method of using the spline cleaning device to clean splines of a gas turbine engine will now be described with reference to the embodiment shown in FIGS. 6 and 7.

The central support 110 and the collector sump 140 are assembled and fastened with the threaded nut 115. Alternatively, the central support 110 and the collector sump 140 may be permanently attached. By allowing the components to be assembled allows for easy storage of the individual components. Having a permanently fixed assembly reduces time needed to assembly the components The assembled central support 110 and collector sump 140 are inserted along the central axis of the gas turbine engine through the rear of the engine.

The collector sump 140 engages the engine beyond the spline 65 of the IPC coupling 60 and covering the oil circulation holes.

The scraper 130 is attached to the central support sleeve 120.

The central support sleeve 120 is positioned over the central support 110, so that the central support sleeve is free to slide and rotate around the support shaft.

The central support sleeve 120 is moved down the central support 110 until the protrusion 192 of the scraper engage with the female spline 65 of the IPC coupling. The central support sleeve 120 is moved with a reciprocating movement forward and aft in the axial direction through the IPC coupling 60 to remove surface debris from the female splines 65. The central support sleeve 120 is moved to disengage with the female splines before being rotated and re-engaged with the female spline. The reciprocating and rotational movement of the central support sleeve is repeating until all female splines have been cleaned.

Optionally, flexible solvent pipes are inserted into the ports 137 of the scraper 130 solvent may be introduced into the flexible solvent pipes to the lubricant passageways 150, to provide mobilising fluid to the surface of the internal splines 65

The central support sleeve 120 and scraper are removed along the axis of the engine.

Additionally, the female splines may be further swabbed to ensure that the female spines 65 are cleaned of all oil debris. Further the collector sump may be swabbed to remove oil debris prior to removal of the collector sump may be swabbed to be removed from the collector.

The additional steps include;

Attaching a swabbing head onto a secondary central support sleeve to form a swabbing head assembly.

Inserting the swabbing head assembly around central support 110 and passing it down the centre line.

Using the swab pads to clean the front and rear of the spline teeth and along the length, sides and crowns on the teeth.

Removing the swabbing head assembly and replacing the swabs and reinserting to continue cleaning, repeating until all debris is removed.

Removing the swabbing head assembly.

Removing the assembled central support 110 and collector sump 140.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A spline cleaning device for cleaning splines formed within a component of a gas turbine engine, the spline cleaning device comprising:

a central support;

a central support sleeve that surrounds and is movable with respect to the central support;

a scraper having protrusions, the scraper being attachable to the central support sleeve, and configured to remove surface contaminants from the splines; and a collector sump that is attachable to the central support and configured to collect the surface contaminants that have been removed from the splines.

2. The spline cleaning device of claim 1, wherein the central support is tubular with a circular cross-section.

3. The spline cleaning device of claim 1, wherein the central support sleeve surrounds at least a substantial portion of the central support.

4. The spline cleaning device of claim 1, wherein the central support sleeve and the central support comprise the same material.

5. The spline cleaning device of claim 1, wherein the scraper has a central hub and a central hole, the central hub has an internal surface that is threaded for attaching the scraper to a corresponding threaded portion on the central support sleeve.

6. The spline cleaning device of claim 5, wherein the central hub has viewing apertures.

7. The spline cleaning device of claim 1, wherein the scraper has arm portions each arm portion having an external circumferential surface upon which the protrusions are formed.

8. The spline cleaning device of claim 7, wherein the arm portions are equally spaced with respect to the central hub.

9. The spline cleaning device of claim 7, wherein the scraper has lubrication ports and lubricant passageways, the lubrication ports being configured to receive a mobilising fluid from a source of mobilising fluid, and the lubricant passageways being configured to transport the mobilising fluid from the lubrication ports to the external circumferential surface of the scraper.

10. The spline cleaning device of claim 1, wherein a material hardness of the protrusions is less than a material harness of the splines.

11. The spline cleaning device of claim 1, wherein the collector sump has a threaded portion that corresponds to a threaded portion of the central support.

12. The spline cleaning device of claim 1, wherein the collector sump is shaped to collect debris from the splines that has been removed by the scraper.

13. The spline cleaning device of claim 1, wherein the collector sump has a sealing lip that seals against the component of the gas turbine engine at a position adjacent the splines.

14. The spline cleaning device of claim 1, wherein the collector sump comprises a material that has a Shore hardness of about 70 A.

15. A method for cleaning splines formed within a shaft of the gas turbine engine, the method comprising the steps of:

providing the spline cleaning device of claim 1;

attaching the central support and the collector sump of the spline cleaning device;

inserting the attached central support and the collector sump along an engine axis of the gas turbine engine beyond a female spline of an IPC coupling so that it covers an engine oil way of the IPC coupling;

attaching the scraper to the central support sleeve;

applying the central support sleeve over the central support and moving the central support sleeve in an axial direction so that the scraper engages with the female spline; and cleaning the female splines by moving the central support sleeve in an axial direction and rotating until all female splines have been cleaned.

* * * * *